US 6,626,060 B2

(12) United States Patent
Matsuo

(10) Patent No.: US 6,626,060 B2
(45) Date of Patent: *Sep. 30, 2003

(54) BICYCLE CABLE CONNECTOR FOR SPLICING TWO CABLES IN SERIES

(75) Inventor: Nobuyuki Matsuo, Shimonoseki (JP)

(73) Assignee: Shimano, Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/002,911

(22) Filed: Nov. 23, 2001

(65) Prior Publication Data
US 2002/0038576 A1 Apr. 4, 2002

Related U.S. Application Data

(62) Division of application No. 09/435,088, filed on Nov. 5, 1999, now Pat. No. 6,349,614.
(60) Provisional application No. 60/107,458, filed on Nov. 6, 1998.

(51) Int. Cl.[7] .............................. F16C 1/22; F16C 1/10
(52) U.S. Cl. ................. 74/502.6; 74/502.4; 74/501.5 R
(58) Field of Search ........................... 74/502.4, 502.6, 74/501.5 R, 502.2, 489; 403/309; 474/80, 164, 165

(56) References Cited

U.S. PATENT DOCUMENTS

| 1,453,426 A | 5/1923 | Williams |
| 2,222,613 A | 11/1940 | Green |
| 2,296,993 A | 9/1942 | Gerry |
| 2,373,776 A | 4/1945 | Parr |
| 2,509,272 A | 5/1950 | Karnuth et al. |

(List continued on next page.)

FOREIGN PATENT DOCUMENTS

| DE | 3429327 A1 | * 8/1985 | ................ 74/502.4 |
| DE | 29608010 | 9/1996 | |
| EP | 105176 A2 | 4/1984 | |

(List continued on next page.)

Primary Examiner—Vinh T. Luong
(74) Attorney, Agent, or Firm—James A. Deland

(57) ABSTRACT

A bicycle cable connector for connecting a first cable to a second cable includes a first connector and a second connector. The first connector include a first cable retaining portion for retaining the first cable and a projection extending along a first connector axis, wherein the projection includes a radially outwardly extending locking member. The second connector includes a second cable retaining portion for retaining the second cable and a tubular portion defining a first connector opening for receiving the first connector therein and having a side wall extending along a second connector axis. The side wall includes a first passage for passing the locking member in the direction of the second connector axis away from the first connector opening, a second passage extending in a circumferential direction, and a recess communicating with the second passage and extending in the direction of the first connector opening for receiving the locking member therein. The first and second passages and the recess may be formed entirely within the inner peripheral surface of the side wall or may be formed by openings that extend through the side wall.

29 Claims, 11 Drawing Sheets

U.S. PATENT DOCUMENTS

| | | | | |
|---|---|---|---|---|
| 3,020,778 A | | 2/1962 | Davidson | 74/489 |
| 3,719,377 A | | 3/1973 | Schultz et al. | |
| 3,871,243 A | * | 3/1975 | Bundschuh et al. | 74/357 |
| 3,920,340 A | | 11/1975 | Jones et al. | |
| 4,076,367 A | | 2/1978 | Avins | |
| 4,887,929 A | | 12/1989 | Hale | 403/328 |
| 5,039,138 A | | 8/1991 | Dickirson | 285/314 |
| 5,366,392 A | | 11/1994 | Raloff et al. | |
| 5,381,706 A | * | 1/1995 | Yanusko et al. | 74/505 |
| 5,431,256 A | | 7/1995 | Wen | |
| 5,575,180 A | | 11/1996 | Simon | 74/502.4 |
| 5,630,338 A | | 5/1997 | Patterson et al. | |
| 5,765,446 A | * | 6/1998 | Patterson et al. | 74/502.4 |
| 5,796,066 A | * | 8/1998 | Guyot | 219/121.48 |
| 5,829,314 A | | 11/1998 | Scura | |
| 5,855,529 A | * | 1/1999 | Sugimoto | 474/80 |
| 6,056,020 A | | 5/2000 | Malone | 138/155 |
| 6,085,611 A | * | 7/2000 | Valdez | 74/502.2 X |
| 6,119,544 A | | 9/2000 | Cebollero | |
| 6,324,938 B1 | * | 12/2001 | Okouchi | 74/502.6 |
| 6,349,614 B1 | * | 2/2002 | Matsuo | 74/502.6 |
| 2002/0035887 A1 | * | 3/2002 | Matsuo | 74/502.6 |

FOREIGN PATENT DOCUMENTS

| | | | | |
|---|---|---|---|---|
| EP | 105176 A3 | 4/1984 | | |
| FR | 359717 | 4/1906 | | |
| GB | 229116 | 2/1925 | | |
| GB | 466888 | 6/1937 | | |
| GB | 531202 | 12/1940 | | |
| GB | 2258028 A | 1/1993 | | |
| JP | 57-83713 | 5/1982 | | |
| JP | 61-37508 | 3/1986 | | |
| JP | 61-45614 | 3/1986 | | |
| JP | 62-40327 | 3/1987 | | |
| JP | 63-80315 | 5/1988 | | |
| JP | 2-141713 | 11/1990 | | |
| JP | 5-32820 | 4/1993 | | |
| JP | 7-6080 | 1/1995 | | |
| JP | 2001-271824 | * | 10/2001 | 74/502.6 |

* cited by examiner

BICYCLE CABLE CONNECTOR FOR SPLICING TWO CABLES IN SERIES

CROSS REFERENCE TO RELATED APPLICATIONS

This application is a division of application Ser. No. 09/435,088, filed Nov. 5, 1999, now U.S. Pat. No. 6,349,614 issued on Feb. 26, 2002; which claims the benefit of 60/107,458, filed Nov. 6, 1998.

BACKGROUND OF THE INVENTION

The present invention is directed to control cables for bicycle transmissions and, more particularly, to a cable connector for splicing two cables in series for use with a bicycle transmission.

Internal hub transmissions are often used on bicycles because the gear shifting mechanism is housed inside the wheel hub and is protected from elements such as rain, mud, etc. The transmission typically is controlled by a control cable of the type having an inner wire that slides within an outer casing (e.g., a Bowden cable), wherein the inner wire is connected to a clutch actuating mechanism disposed on the side of the hub. Gear shifting is accomplished by selectively pulling and releasing the inner wire.

When installing or removing the hub transmission, or when changing the control cable, the control cable must be connected to and disconnected from the clutch actuating mechanism. However, the clutch actuating mechanism is usually disposed in close proximity to the hub axle which, in turn, is coupled to the rear fork ends of the bicycle. As a result, there is very little space to access the cable coupling mechanism, and sometimes the entire wheel must be removed from the bicycle before the cable can be disconnected. When the wheel is removed, the cable is still attached to the hub, thus making wheel removal very awkward. Also, some clutch actuating mechanisms have the form of an annular ring disposed around the hub axle. Thus, changing the control cable inevitably requires removal of the rear wheel. This is very inconvenient for the bicycle mechanic.

SUMMARY OF THE INVENTION

The present invention is directed to a bicycle cable connector for splicing two cables together in series so that the cable may be quickly uncoupled from the transmission, thus making it very easy to remove the hub from the bicycle or replace the control cable. In one embodiment of the present invention, a bicycle cable connector for connecting a first cable to a second cable includes a first connector and a second connector. The first connector includes a first cable retaining portion for retaining the first cable and a projection extending along a first connector axis, wherein the projection includes a radially outwardly extending locking member. The second connector includes a second cable retaining portion for retaining the second cable and a tubular portion defining a first connector opening for receiving the first connector therein and having a side wall extending along a second connector axis. The side wall includes a first passage for passing the locking member in the direction of the second connector axis away from the first connector opening, a second passage extending in a circumferential direction, and a recess communicating with the second passage and extending in the direction of the first connector opening for receiving the locking member therein. The first and second passages and the recess may be formed entirely within the inner peripheral surface of the side wall or may be formed by openings that extend through the side wall.

In another embodiment of the present invention, a bicycle cable connector for connecting a first cable to a second cable includes a first connector and a second connector. The first connector includes a first cable retaining portion for retaining the first cable and a projection extending along a first connector axis, wherein the projection includes a threaded outer peripheral surface extending completely around the projection. The second connector includes a second cable retaining portion for retaining the second cable and a tubular portion having a threaded inner peripheral surface extending completely around the inner peripheral surface for engaging the threaded outer peripheral surface of the projection.

As applied to a clutch actuator member for a bicycle hub transmission, the clutch actuator may include a frame having a first end and a second end, a casing support disposed at the first end of the frame for supporting the outer casing of a control cable assembly which includes a first cable therein, an annular clutch actuating member rotatably mounted at the second end of the frame, and a second cable retained to the clutch actuating member for rotating the clutch actuating member. First and second connectors constructed as above may be provided for connecting the first cable to the second cable.

DETAILED DESCRIPTION OF THE EMBODIMENTS

Figure 1:
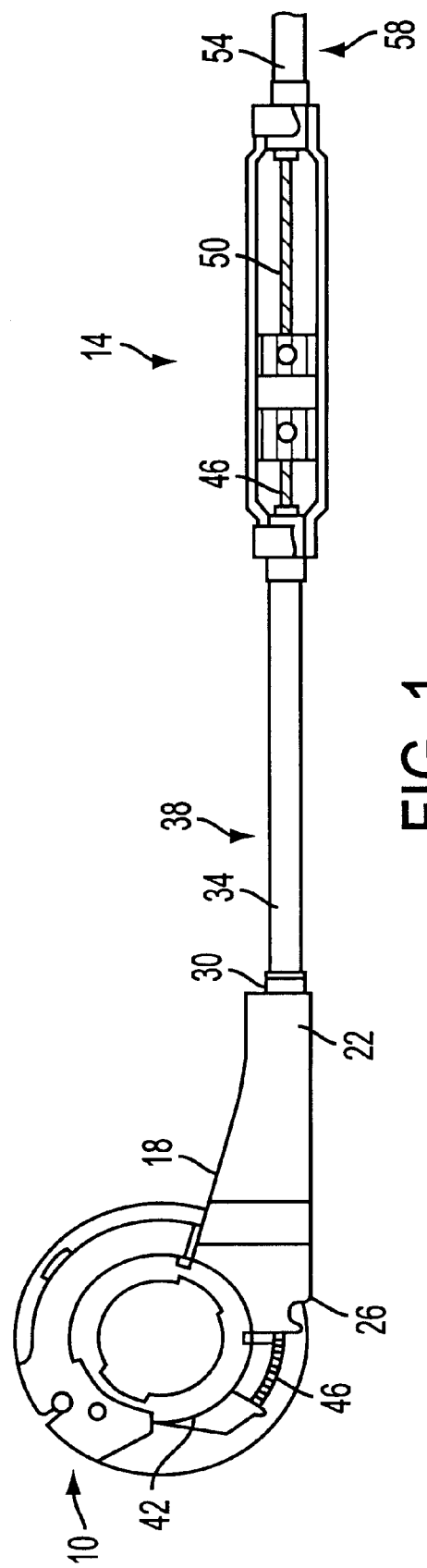
FIG. 1 is a plan view of a bicycle hub clutch actuator which incorporates a particular embodiment of a cable coupling device according to the present invention.

FIG. 1 is a plan view of a bicycle hub clutch actuator 10 which incorporates a particular embodiment of a cable coupling device 14 according to the present invention. Clutch actuator 10 includes a frame 18 having a first end 22 and a second end 26. A casing support 30 is disposed at the first end 22 of frame 18 for supporting a second outer casing 34 of a second control cable assembly 38, and an annular clutch actuating member 42 is rotatably mounted at the second end 26 of the frame. A second inner cable 46 is retained to the clutch actuating member 42 for rotating clutch actuating member 42 which, in turn, actuates a clutch in a hub transmission (not shown) in a conventional manner. Inner cable 46 slides within outer casing 34 of control cable assembly 38 and terminates at cable coupling device 14. Cable coupling device 14 couples inner cable 46 to a first inner cable 50 that slides within a first outer casing 54 of a first control cable assembly 58.

Figure 2:
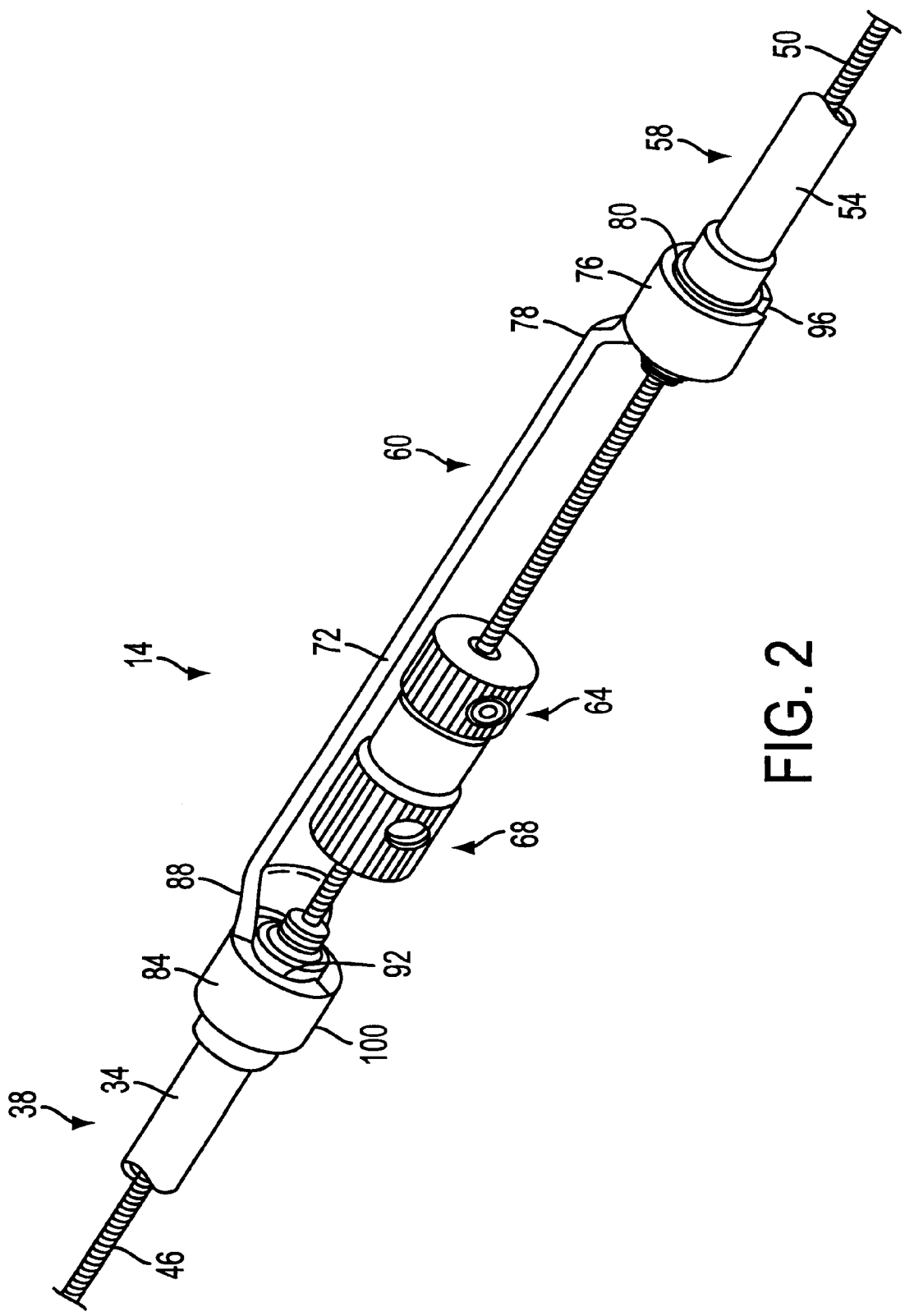
FIG. 2 is a detailed oblique view of the cable coupling device shown in FIG. 1.
Figure 3:
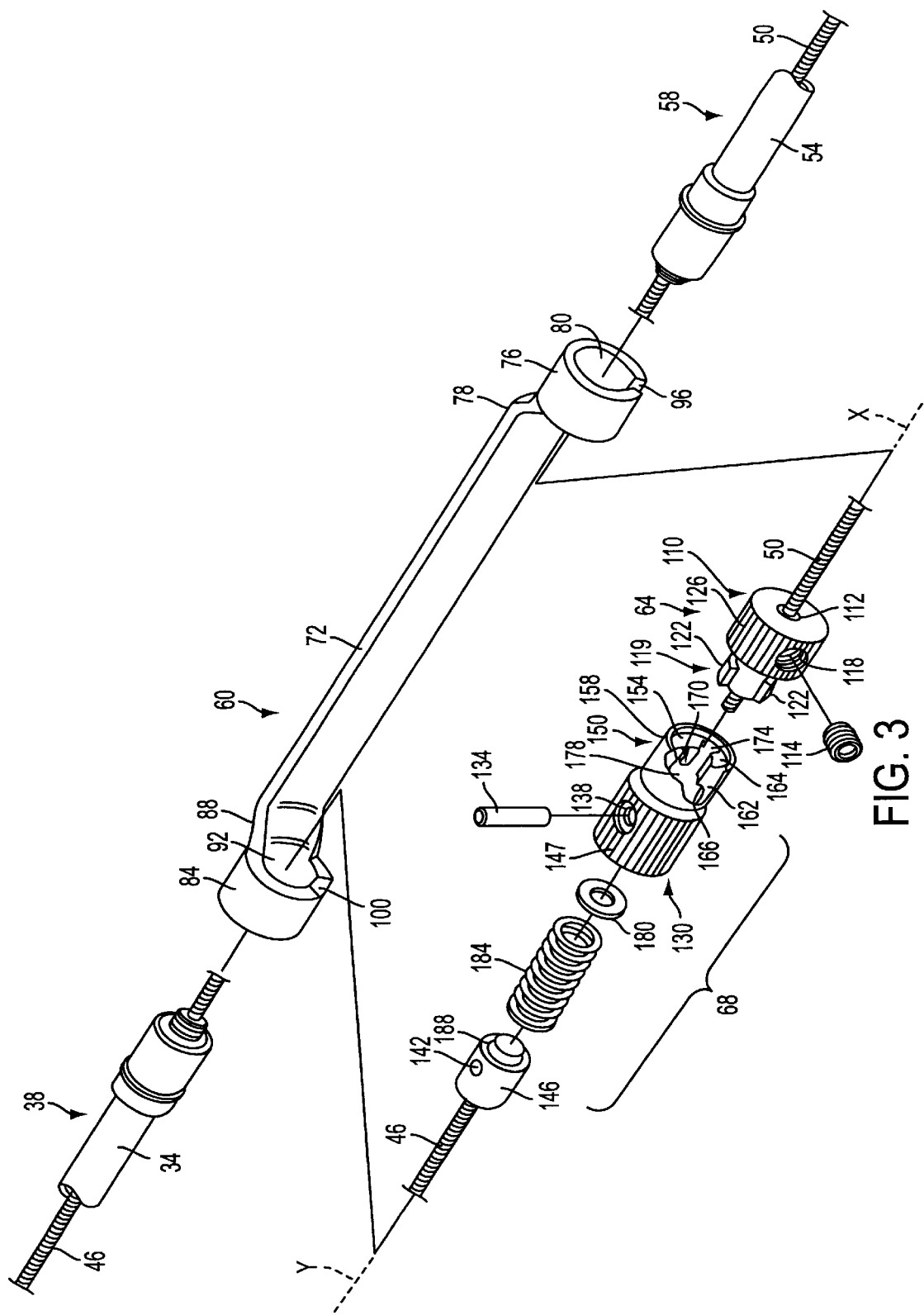
FIG. 3 is an exploded view of the cable coupling device shown in FIG. 1.
Figure 4:
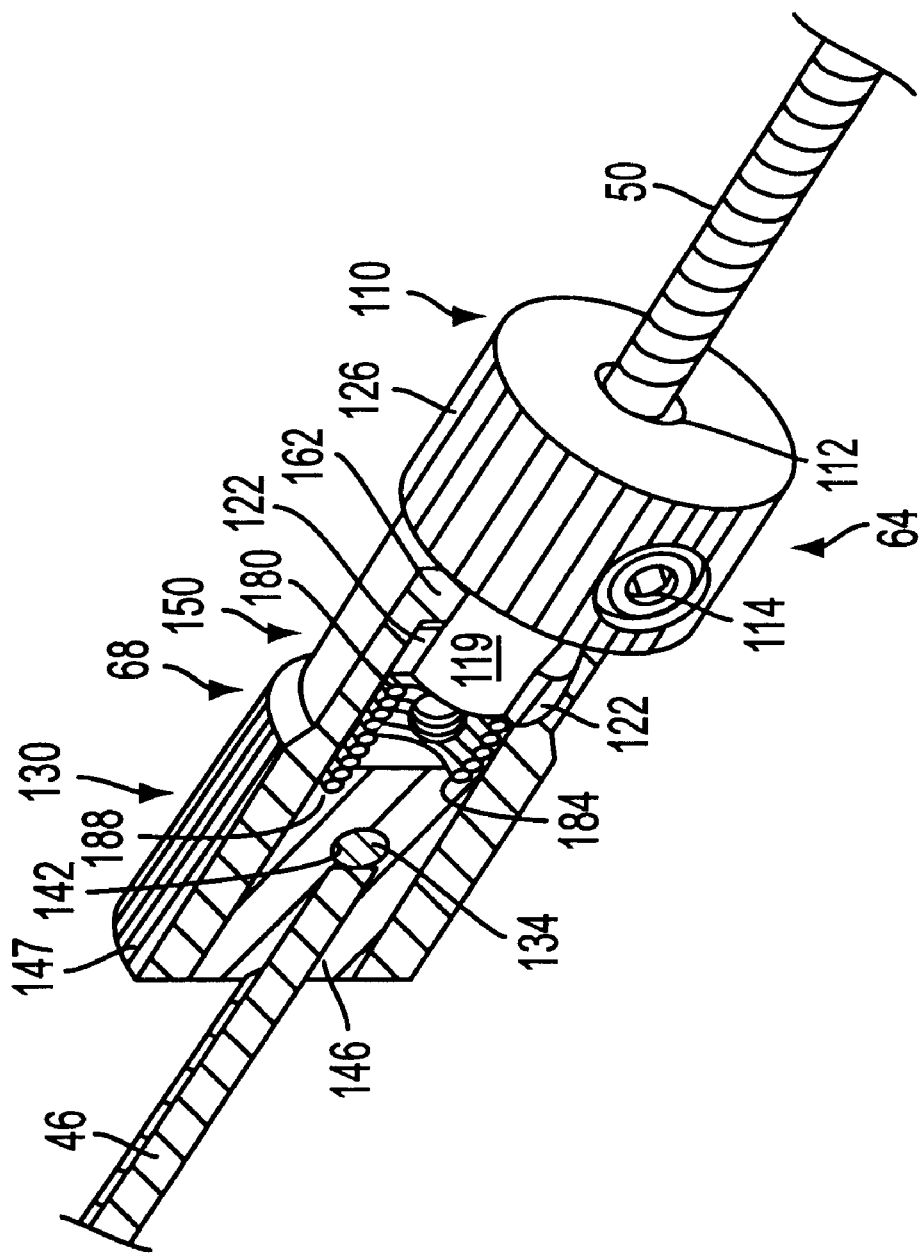
FIG. 4 is an oblique partial cross sectional view of the first and second connectors shown in FIG. 1 in a connected state.

FIG. 2 is a detailed oblique view of the cable coupling device 14 shown in FIG. 1, and FIG. 3 is an exploded view of cable coupling device 14. As shown in those Figures, cable connecting device 14 includes a bracket 60, a first connector 64 and a second connector 68. FIG. 4 is an oblique partial cross sectional view of first connector 64 and second connector 68 in a connected state.

Bracket 60 includes an elongated brace member 72; a first casing support collar 76 disposed at a first end 78 of brace member 72 and defining a first outer casing opening 80 for supporting outer casing 54 of control cable assembly 58 therein; and a second casing support collar 84 disposed at a second end 88 of brace member 72 and defining a second outer casing opening 92 for supporting outer casing 34 of control cable assembly 38 therein. First casing support collar 76 defines a first slit 96 opposite brace member 72 for receiving outer casing 54 of control cable assembly 58 therethrough, and second casing support collar 84 defines a second slit 100 opposite brace member 72 for receiving outer casing 34 of control cable assembly 38 therethrough.

First connector 64 includes a first cable retaining portion 110 having a cable opening 112 for retaining inner cable 50 by a threaded fastener such as a fixing bolt 114 that screws into a threaded opening 118 and abuts against cable 50. The outer peripheral surface 126 of first cable retaining portion 110 is knurled to facilitate manipulation during assembly and disassembly of cable coupling device 14. First connector 64 also includes first connector locking portion in the form of a generally cylindrical projection 119 extending along a first connector axis X, wherein projection 119 includes a pair of diametrically opposed and radially outwardly extending locking members 122.

Second connector 68 includes a second cable retaining portion 130 for retaining a cable end bead 146 of inner cable 46 of control cable assembly 38 by a fastener such as a rivet 134 that extends through an opening 138 in second cable retaining portion 130 and through an opening 142 in a cable end bead 146 attached to the end of inner cable 46. The outer peripheral surface 147 of second cable retaining portion 130 is knurled to facilitate manipulation during assembly and disassembly of cable coupling device 14. Second connector 68 also includes a tubular portion 150 defining a first connector opening 154 for receiving projection 119 of first connector 64 therein. Tubular portion 150 includes a side wall 158 extending along a second connector axis Y, wherein side wall 158 includes a second connector locking portion in the form of a locking wall 162 extending radially inwardly from an inner peripheral surface of side wall 158 and having a front side 164 and a rear side 166. Locking wall 162 extends in a circumferential direction of the tubular portion and includes diametrically opposed recesses 170 (only one recess is shown in FIG. 3) extending in the direction of the second connector axis Y toward first connector opening 154 for receiving the pair of locking members 122 of first connector 64 therein. Side wall 158 defines diametrically opposed first passages 174 (only one such passage is shown in FIG. 3) for passing the locking members 122 in a direction of second connector axis Y away from first connector opening 154 from the front side 164 of locking wall 162 to the rear side of locking wall 162, and diametrically opposed second passages 178 (only one such passage is shown in FIG. 3) extending in a circumferential direction for passing the locking members 122 along the rear side 166 of locking wall 162 to the recesses 170. In this embodiment, the first passages 174, the second passages 178 and the recesses 170 do not extend through side wall 158 so that projection 119 is covered by tubular portion 150.

Second connector 68 also includes an abutment member 180 in the form of a round washer slidingly disposed in tubular portion 150 and a biasing member in the form of a spring 184 for biasing abutment member 180 toward first connector opening 154. Spring 184 is disposed between abutment member 180 and an abutment 188 formed on cable end bead 146. Thus, abutment member 180 and spring 184 cause cable terminating bead 146 and projection 119 to be biased away from each other so that locking projections 122 are firmly seated in recesses 170.

In use, inner cable 46 is coupled to inner cable 50 by inserting locking members 122 through first passages 174 until locking members 122 are located at the rear side 166 of locking wall 162. Thereafter, first connector 64 is rotated clockwise in FIG. 3 relative to second connector 68 so that locking members 122 move in the circumferential direction within second connector 130 until locking members 122 reach recesses 170. Locking members 122 then are seated in recesses 170 and held firmly in place by spring 184 and abutment member 180. Inner cable 46 is disconnected from inner cable 50 by reversing this procedure.

Figure 5:
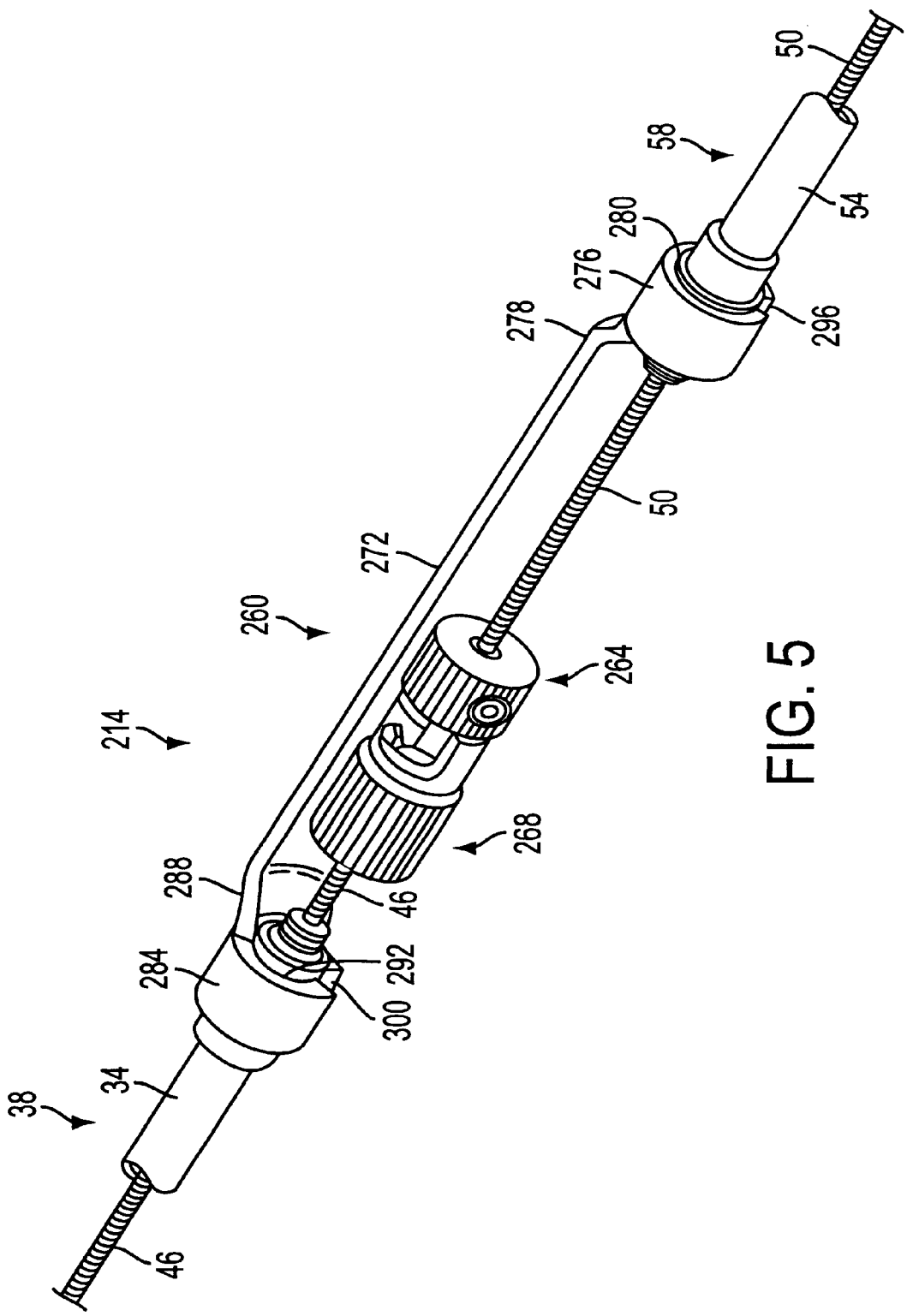
FIG. 5 is a detailed oblique view of an alternative embodiment of a cable coupling device according to the present invention.
Figure 6:
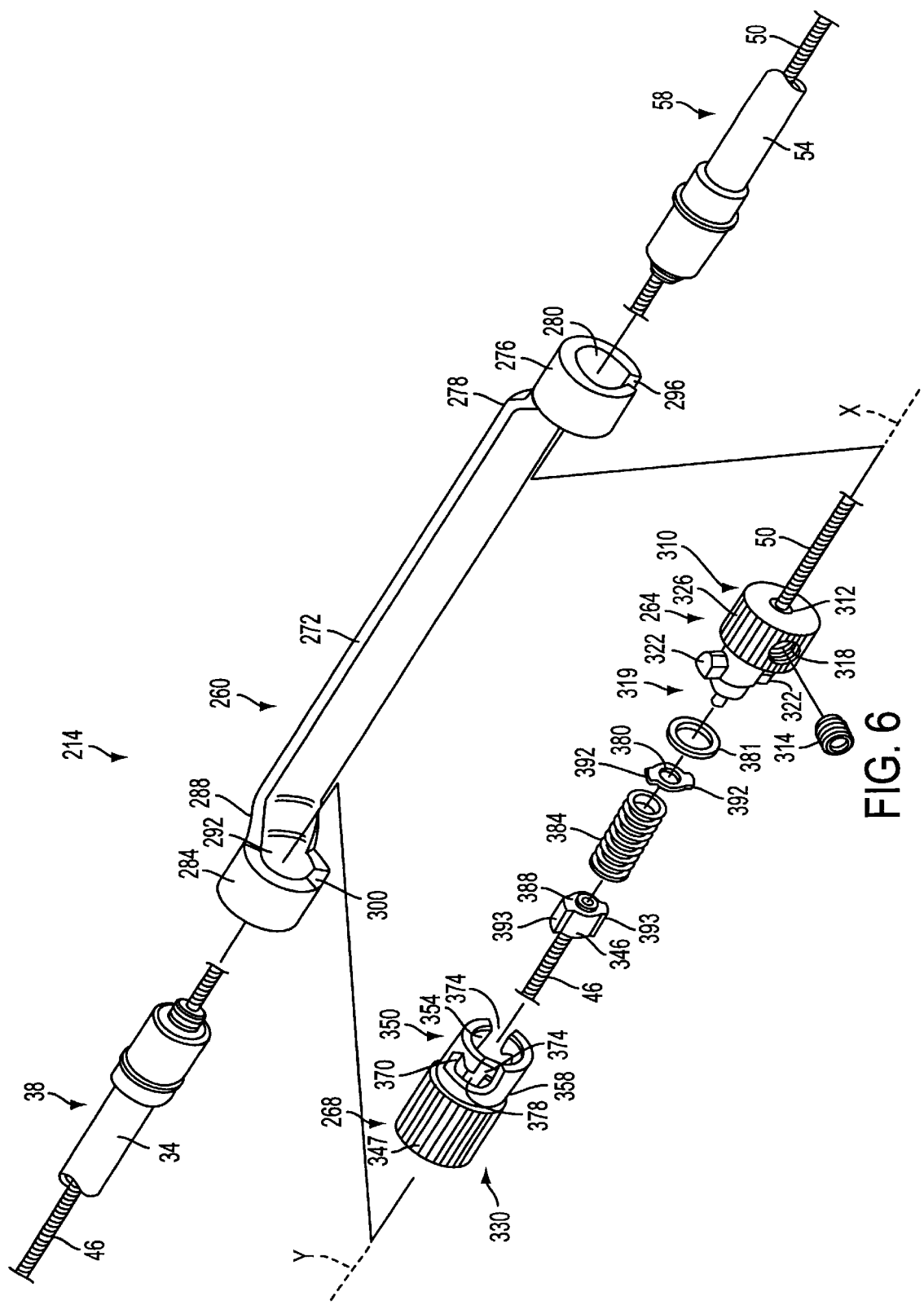
FIG. 6 is an exploded view of the cable coupling device shown in FIG. 5.
Figure 7:
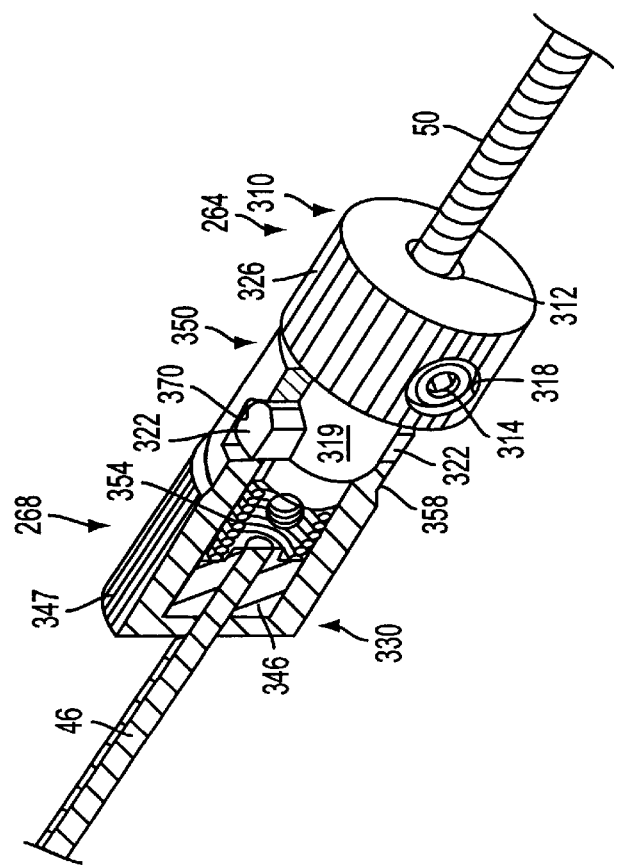
FIG. 7 is an oblique partial cross sectional view of the first and second connectors shown in FIG. 5 in a connected state.

FIG. 5 is a detailed oblique view of an alternative embodiment of a cable coupling device 214 according to the present invention, and FIG. 6 is an exploded view of cable coupling device 214. As with the first embodiment described above, cable connecting device 214 includes a bracket 260, a first connector 264 and a second connector 268. FIG. 7 is an oblique partial cross sectional view of first connector 264 and second connector 268 in a connected state.

Bracket 260 includes an elongated brace member 272; a first casing support collar 276 disposed at a first end 278 of brace member 272 and defining a first outer casing opening 280 for supporting outer casing 54 of control cable assembly 58 therein; and a second casing support collar 284 disposed at a second end 288 of brace member 272 and defining a second outer casing opening 292 for supporting outer casing 34 of control cable assembly 38 therein. First casing support collar 276 defines a first slit 296 opposite brace member 272 for receiving outer casing 54 of control cable assembly 58 therethrough, and second casing support collar 284 defines a second slit 300 opposite brace member 272 for receiving outer casing 34 of control cable assembly 38 therethrough.

First connector 264 includes a first cable retaining portion 310 having a cable opening 312 for retaining inner cable 50 by a threaded fastener such as a fixing bolt 314 that screws into a threaded opening 318 and abuts against inner cable 50. The outer peripheral surface 326 of first cable retaining portion 310 is knurled to facilitate manipulation during assembly and disassembly of cable coupling device 214. First connector 264 also includes a first connector locking portion in the form of a generally cylindrical projection 319 extending along a first connector axis X, wherein projection 319 includes a pair of diametrically opposed and radially outwardly extending locking members 322.

Second connector 268 includes a second cable retaining portion 330 for retaining a cable end bead 346 of inner cable 46 of control cable assembly 38. The outer peripheral surface 347 of second cable retaining portion 330 is knurled to facilitate manipulation during assembly and disassembly of cable coupling device 214. Second connector 268 also includes a tubular portion 350 defining a first connector opening 354 for receiving projection 319 of first connector 264 therein. Tubular portion 350 includes a second connector locking portion in the form of a side wall 358 extending along a second connector axis Y. Side wall 358 includes diametrically opposed first passages 374 for passing the locking members 322 in a direction of second connector axis Y away from first connector opening 354, diametrically opposed second passages 378 extending in a circumferential direction, and recesses 370 extending in a direction of the second connector axis Y toward first connector opening 354 for forming seats for locking members 322. In this embodiment, the first passages 374, the second passages 378 and the recesses 370 extend through side wall 358 so the projections 322 are exposed.

Figure 8:
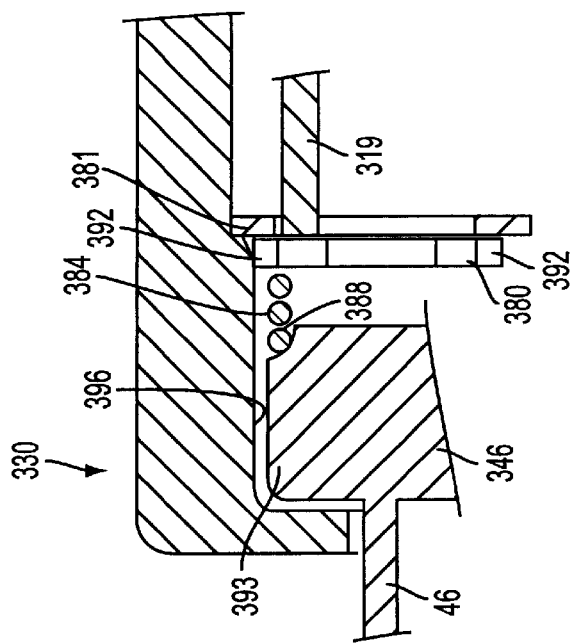
FIG. 8 is a detailed cross sectional view showing the abutment members and springs shown in FIG. 6 in the assembled state.

Second connector 268 also includes an abutment member 380 slidingly disposed in tubular portion 350, an abutment member 381 press fit into tubular portion 350 as shown more clearly in FIG. 8, and a biasing member in the form of a spring 384 for biasing abutment member 380 toward first connector opening 354. As shown in FIGS. 6 and 8, spring 384 is disposed between abutment member 380 and an abutment 388 formed on cable end bead 346. Thus, abutment member 380 and spring 384 cause cable terminating bead 346 and projection 319 to be biased away from each other so that locking projections 322 are firmly seated in recesses 370. To ensure stability of movement of abutment member 380 and cable end bead 346 within tubular portion 350, abutment member 380 includes diametrically opposed guide projections 392 which slide within a complementary pair of guide grooves 396 formed in the inner peripheral surface of tubular portion 350, wherein guide grooves 396 extend in a direction of the second connector axis Y. Cable end bead 346 has similar diametrically opposed guide projections 393 which slide within guide grooves 396.

In use, inner cable 46 is coupled to inner cable 50 by inserting locking members 322 through first passages 374 until locking members 322 are located at the position of second passages 378. Thereafter, first connector 264 is rotated clockwise in FIG. 6 relative to second connector 268 so that locking members 322 move in the circumferential direction within second connector 268 until locking members 322 reach recesses 370. Locking members 322 then are seated in recesses 370 and are held firmly in place by spring 384 and abutment member 380. Inner cable 46 is disconnected from inner cable 50 by reversing this procedure.

Figure 9:
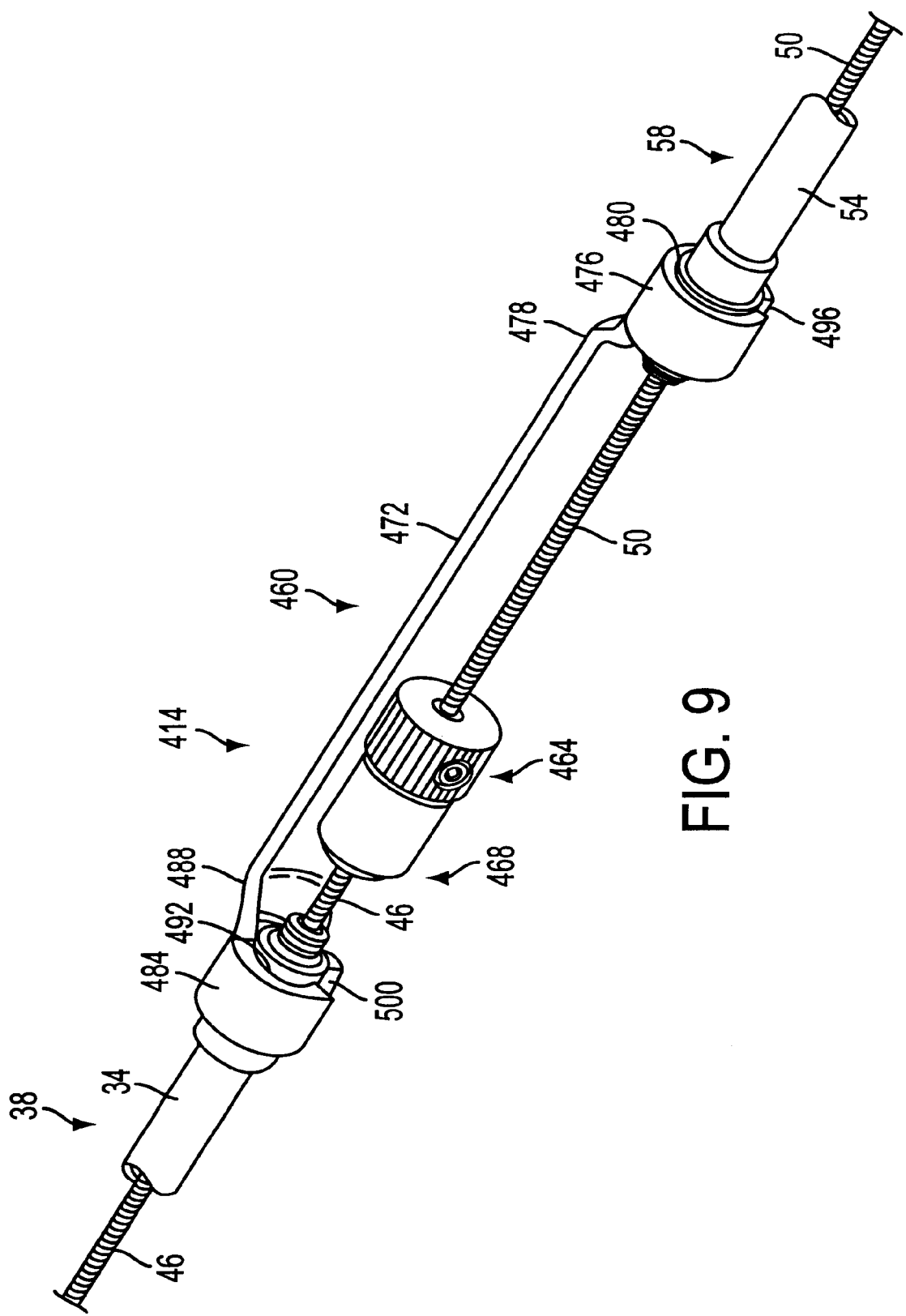
FIG. 9 is a detailed oblique view of another alternative embodiment of a cable coupling device according to the present invention.
Figure 10:
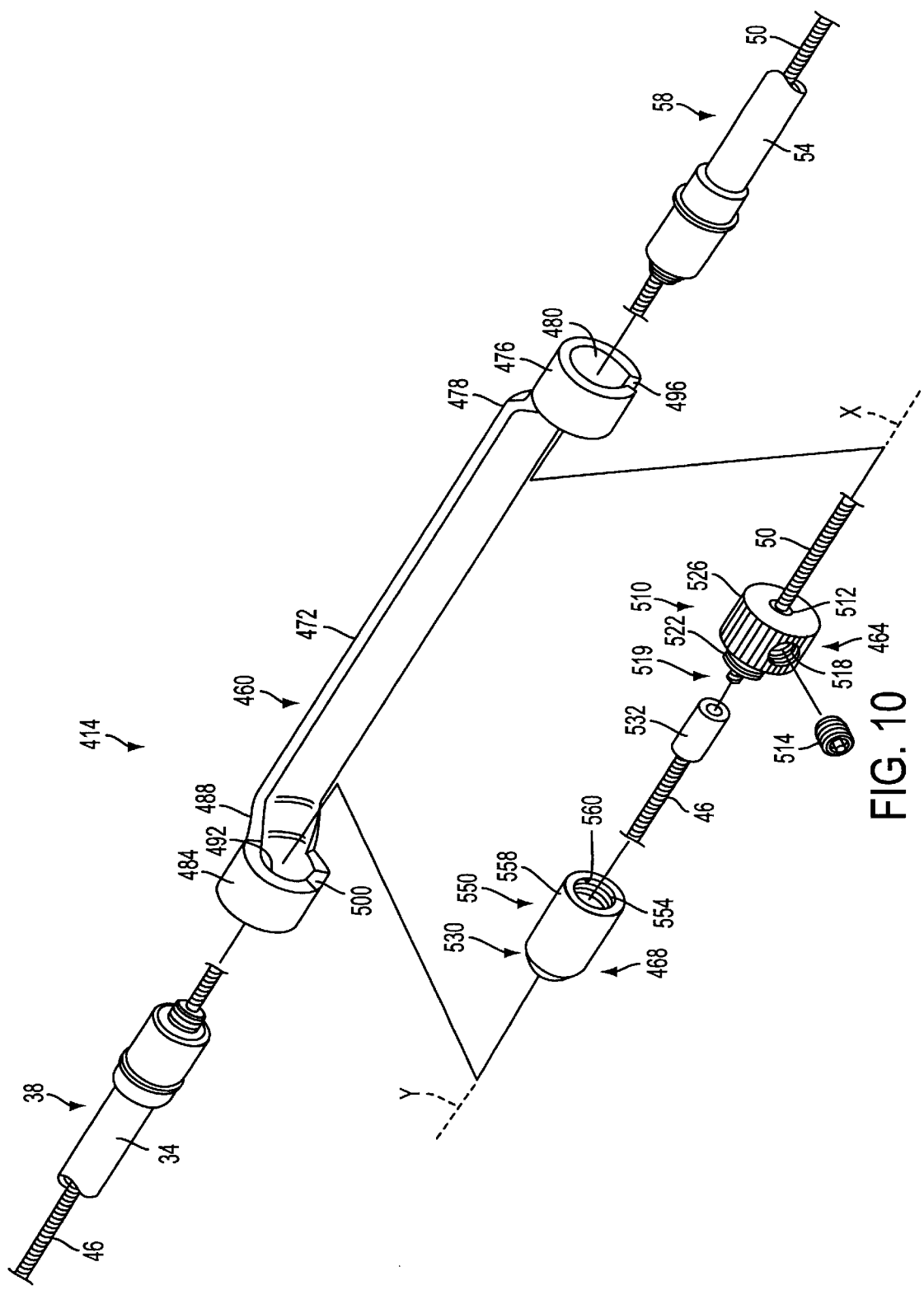
FIG. 10 is an exploded view of the cable coupling device shown in FIG. 9.
Figure 11:
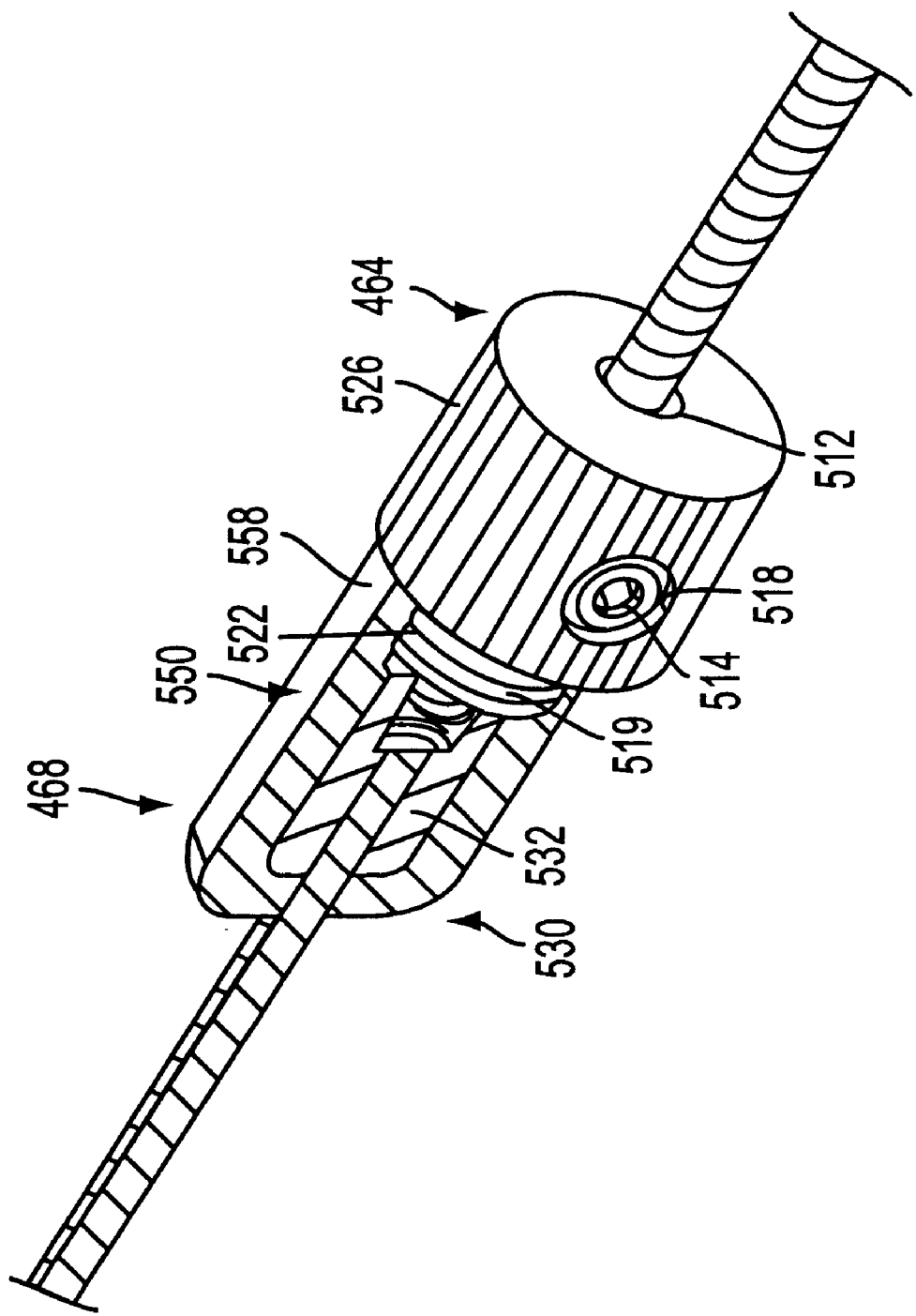
FIG. 11 is an oblique partial cross sectional view of the first and second connectors shown in FIG. 9 in a connected state.

FIG. 9 is a detailed oblique view of another alternative embodiment of a cable coupling device 414 according to the present invention, and FIG. 10 is an exploded view of cable coupling device 414. As with the first two embodiments, cable connecting device 414 includes a bracket 460, a first connector 464 and a second connector 468. FIG. 11 is an oblique partial cross sectional view of first connector 464 and second connector 468 in a connected state.

Bracket 460 includes an elongated brace member 472; a first casing support collar 476 disposed at a first end 478 of brace member 472 and defining a first outer casing opening 480 for supporting outer casing 54 of control cable assembly 58 therein; and a second casing support collar 484 disposed at a second end 488 of brace member 472 and defining a second outer casing opening 492 for supporting outer casing 34 of control cable assembly 38 therein. First casing support collar 476 defines a first slit 496 opposite brace member 472 for receiving outer casing 54 of control cable assembly 58 therethrough, and second casing support collar 484 defines a second slit 500 opposite brace member 472 for receiving outer casing 34 of control cable assembly 38 therethrough.

First connector 464 includes a first cable retaining portion 510 having a cable opening 512 for retaining inner cable 50 by a threaded fastener such as a fixing bolt 514 that screws into a threaded opening 518 and abuts against inner cable 50. The outer peripheral surface 526 of first cable retaining portion 510 is knurled to facilitate manipulation during assembly and disassembly of cable coupling device 414. First connector 464 also includes a first connector locking portion in the form of a generally cylindrical projection 519 extending along a first connector axis X, wherein projection 519 includes a threaded outer peripheral surface 522 extending completely around projection 519.

Second connector 468 includes a second cable retaining portion 530 for retaining a generally cylindrical cable end bead 532 of inner cable 46 of control cable assembly 38. Second connector 468 also includes a tubular portion 550 defining a first connector opening 554 for receiving projection 519 of first connector 464 therein. Tubular portion 550 includes a side wall 558 extending along a second connector axis Y, wherein an inner peripheral surface 560 of side wall 558 is threaded completely in the circumferential direction to form a second connector locking portion. Thus, in this embodiment inner cable 46 is coupled to inner cable 50 by screwing first connector 464 to second connector 468.

Figure 12:
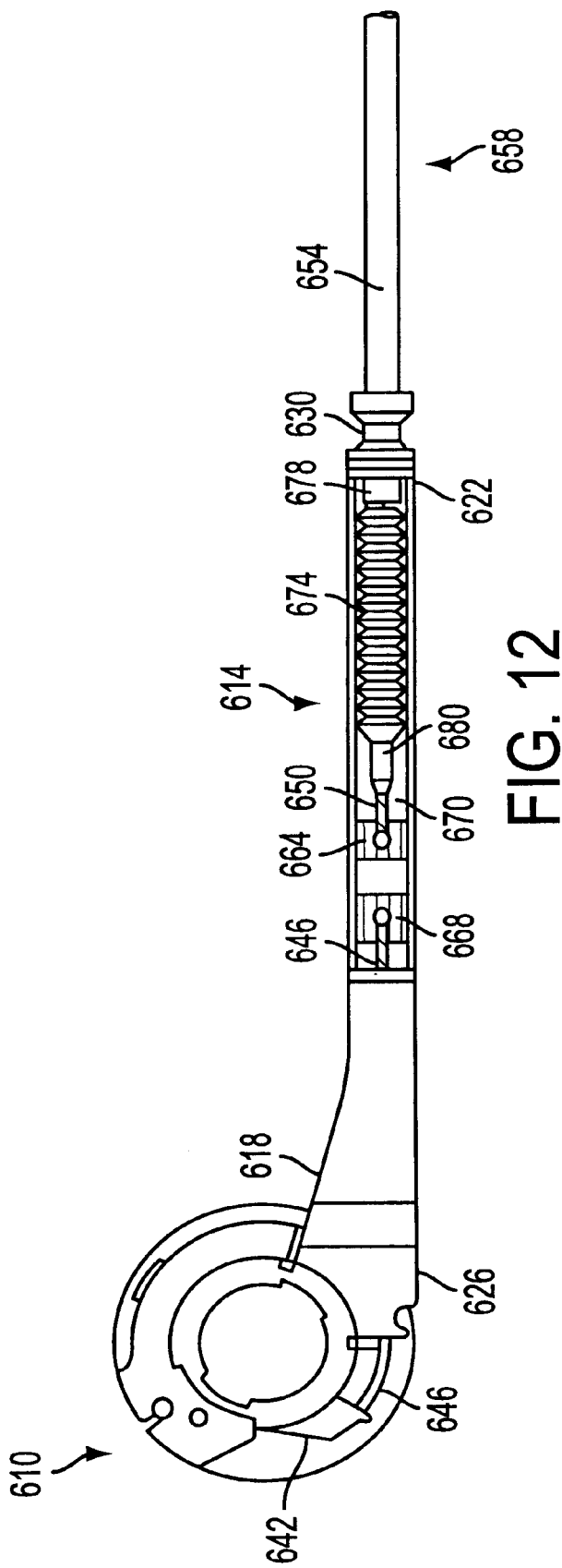
FIG. 12 is a plan view of a bicycle hub clutch actuator which incorporates an alternative embodiment of a cable coupling device according to the present invention.

FIG. 12 is a plan view of an alternative embodiment of a bicycle hub clutch actuator 610 which incorporates an embodiment of a cable coupling device 614 according to the present invention. In this embodiment, clutch actuator 610 includes a frame 618 having a first end 622 and a second end 626. A casing support 630 is disposed at the first end 622 of frame 618 for supporting the outer casing 654 of a control cable assembly 658, wherein control cable assembly 658 includes a first cable 650 that slides within outer casing 654. An annular clutch actuating member 642 is rotatably mounted at the second end 626 of frame 618, and a second cable 646 is retained to clutch actuating member 642 for rotating clutch actuating member 642. Cable coupling device 614 includes a first connector 664 and a second connector 668 that may be constructed according to any of the embodiments described above. In this embodiment, frame 618 has an opening 670 for exposing first connector 664 and second connector 668 to facilitate assembly and disassembly of inner cables 646 and 650. A flexible cover in the form of a bellows 674 having a first end 678 mounted to first end 622 of frame 618 and a second end 680 mounted to cable 650 is provided to prevent contaminants from entering between outer casing 654 and inner cable 650 and thereby adversely affect the operation of control cable assembly 658.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A clutch actuator for connecting to a first control cable having a first cable sliding within a first outer casing, the clutch actuator comprising:
   a frame having a first end and a second end;
   an annular clutch actuating member rotatably mounted at the second end of the frame;
   a second control cable having a second cable sliding within a second outer casing, wherein the second cable is retained to the clutch actuating member for rotating the clutch actuating member;
   a casing support disposed at the first end of the frame for supporting the second outer casing of the second control cable;
   a first connector including:
      a first cable retaining portion for retaining the first cable; and
      a first connector locking portion;
   a second connector including:
      a second cable retaining portion for retaining the second cable; and
      a second connector locking portion for engaging the first connector locking portion; and
   wherein the second outer casing is disposed between the first end of the frame and the second connector.

2. A clutch actuator for connecting to a first control cable having a first cable sliding within a first outer casing, the clutch actuator comprising:
   a frame having a first end and a second end;
   a casing support disposed at the first end of the frame for supporting the first outer casing of the first control cable;
   an annular clutch actuating member rotatably mounted at the second end of the frame;
   a second cable retained to the clutch actuating member for rotating the clutch actuating member;
   a first connector including:
      a first cable retaining portion for retaining one of the first cable and the second cable; and
      a projection extending along a first connector axis, wherein the projection includes a locking member that extends radially outwardly from an outer peripheral surface of the projection;
   a second connector including:
      a second cable retaining portion for retaining the other one of the first cable and the second cable;
      a tubular portion defining a first connector opening for receiving the first connector therein and having a side wall extending along a second connector axis, wherein the side wall includes:
         a first passage for passing the locking member in the direction of the second connector axis away from the first connector opening;
         a second passage extending in a circumferential direction; and
         a recess communicating with the second passage and extending in the direction of the first connector opening for receiving the locking member therein.

3. The cable connector according to claim 2 further comprising a first cable fastener for retaining the one of the first cable and the second cable to the first cable retaining portion.

4. The cable connector according to claim 3 wherein the first cable fastener comprises a fixing bolt.

5. The cable connector according to claim 2 further comprising a second cable fastener for retaining the other one of the first cable and the second cable to the second cable retaining portion.

6. The cable connector according to claim 5 wherein the second cable fastener comprises a rivet.

7. The cable connector according to claim 2 wherein the first passage is defined by a first passage opening extending through the side wall.

8. The cable connector according to claim 2 wherein the second passage is defined by a second passage opening extending through the side wall.

9. The cable connector according to claim 2 wherein the recess is defined by a recess opening extending through the side wall.

10. The cable connector according to claim 2 wherein the first passage is defined by a first passage opening extending through the side wall, wherein the second passage is defined by a second passage opening extending through the side wall, and wherein the recess is defined by a recess opening extending through the side wall.

11. The cable connector according to claim 10 further comprising a first cable fastener for retaining the one of the first cable and the second cable to the first cable retaining portion.

12. The cable connector according to claim 11 wherein the first cable fastener comprises a fixing bolt.

13. The cable connector according to claim 10 further comprising:
   abutment member slidingly disposed in the tubular portion; and
   a biasing member for biasing the abutment member toward the first connector opening.

14. The cable connector according to claim 13 wherein the abutment member includes a guide projection which slides within a guide groove formed in the tubular portion, wherein the guide groove extends in a direction of the second connector axis.

15. The cable connector according to claim 14 wherein the biasing member comprises a spring.

16. A clutch actuator for connecting to a first control cable having a first cable sliding within a first outer casing, the clutch actuator comprising:
   a frame having a first end and a second end;
   a casing support disposed at the first end of the frame for supporting the first outer casing of the first control cable;
   an annular clutch actuating member rotatably mounted at the second end of the frame;
   a second cable retained to the clutch actuating member for rotating the clutch actuating member;
   a first connector including:
      a first cable retaining portion for retaining one of the first cable and the second cable; and
      a projection extending along a first connector axis, wherein the projection includes a radially outwardly extending locking member;
   a second connector including:
      a second cable retaining portion for retaining the other one of the first cable and the second cable;
      a tubular portion defining a first connector opening for receiving the first connector therein and having a side wall extending along a second connector axis, wherein the side wall includes:
         a first passage for passing the locking member in the direction of the second connector axis away from the first connector opening;

a second passage extending in a circumferential direction;

a recess communicating with the second passage and extending in the direction of the first connector opening for receiving the locking member therein;

an abutment member slidingly disposed in the tubular portion; and a biasing member for biasing the abutment member toward the first connector opening.

17. The cable connector according to claim 16 wherein the abutment member includes a guide projection which slides within a guide groove formed in the tubular portion, wherein the guide groove extends in a direction of the second connector axis.

18. The cable connector according to claim 16 wherein the biasing member comprises a spring.

19. A clutch actuator for connecting to a first control cable having a first cable sliding within a first outer casing, the clutch actuator comprising:

a frame having a first end and a second end;

a casing support disposed at the first end of the frame for supporting the first outer casing of the first control cable;

an annular clutch actuating member rotatably mounted at the second end of the frame;

a second cable retained to the clutch actuating member for rotating the clutch actuating member;

a first connector including:
  a first cable retaining portion for retaining one of the first cable and the second cable; and
  a projection extending along a first connector axis, wherein the projection includes a radially outwardly extending locking member;

a second connector including:
  a second cable retaining portion for retaining the other one of the first cable and the second cable;
  a tubular portion defining a first connector opening for receiving the first connector therein and having a side wall extending along a second connector axis, wherein the side wall includes:
    a first passage for passing the locking member in the direction of the second connector axis away from the first connector opening;
    a second passage extending in a circumferential direction; and
    a recess communicating with the second passage and extending in the direction of the first connector opening for receiving the locking member therein;

wherein the side wall of the tubular portion includes a locking wall extending radially inwardly from an inner peripheral surface of the side wall and having a front side and a rear side, wherein the locking wall extends in a circumferential direction of the tubular portion and includes the recess extending in the direction of the second connector axis for receiving the locking member therein;

wherein the first passage passes the locking member from the front side of the locking wall to the rear side of the locking wall; and wherein the second passage passes the locking member along the rear side of the locking wall to the recess.

20. The cable connector according to claim 19 wherein the first passage does not extend through the side wall.

21. The cable connector according to claim 19 wherein the second passage does not extend through the side wall.

22. The cable connector according to claim 19 wherein the recess does not extend through the side wall.

23. The cable connector according to claim 19 wherein the first passage does not extend through the side wall, wherein the second passage does not extend through the side wall, and wherein the recess does not extend through the side wall.

24. The cable connector according to claim 19 further comprising a first cable fastener for retaining the one of the first cable and the second cable to the first cable retaining portion.

25. The cable connector according to claim 24 wherein the first cable fastener comprises a fixing bolt.

26. The cable connector according to claim 19 further comprising a second cable fastener for retaining the other one of the first cable and the second cable to the second cable retaining portion.

27. The cable connector according to claim 26 wherein the second cable fastener comprises a rivet.

28. The cable connector according to claim 19 further comprising: an abutment member slidingly disposed in the tubular portion; and a biasing member for biasing the abutment member toward the first connector opening.

29. The cable connector according to claim 28 wherein the biasing member comprises a spring.

* * * * *